(12) United States Patent
Shafin et al.

(10) Patent No.: US 12,395,955 B2
(45) Date of Patent: Aug. 19, 2025

(54) METHOD AND APPARATUS FOR MOBILE AP MLD OPERATION

(71) Applicant: Samsung Electronics Co., Ltd., Suwon-si (KR)

(72) Inventors: Rubayet Shafin, Allen, TX (US); Boon Loong Ng, Plano, TX (US); Peshal Nayak, Plano, TX (US); Vishnu Vardhan Ratnam, Plano, TX (US); Ahmed Atef Ibrahim Ibrahim, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 387 days.

(21) Appl. No.: 18/163,193

(22) Filed: Feb. 1, 2023

(65) Prior Publication Data

US 2023/0254790 A1    Aug. 10, 2023

Related U.S. Application Data

(60) Provisional application No. 63/306,853, filed on Feb. 4, 2022.

(51) Int. Cl.
*H04W 56/00* (2009.01)
*H04W 76/15* (2018.01)
(Continued)

(52) U.S. Cl.
CPC ........ *H04W 56/0025* (2013.01); *H04W 76/15* (2018.02); *H04W 88/02* (2013.01); *H04W 88/08* (2013.01)

(58) Field of Classification Search
None
See application file for complete search history.

(56) References Cited

U.S. PATENT DOCUMENTS

| 2021/0014811 A1 | 1/2021 | Seok et al. |
| 2021/0266891 A1* | 8/2021 | Chu ................. H04L 5/1469 |

(Continued)

FOREIGN PATENT DOCUMENTS

| WO | 2021002618 A1 | 1/2021 |
| WO | 2021241918 A1 | 12/2021 |

OTHER PUBLICATIONS

Extended European Search Report issued Oct. 14, 2024 regarding Application No. 23749970.2, 13 pages.

(Continued)

*Primary Examiner* — Diane L Lo

(57) ABSTRACT

Methods and apparatuses for facilitating mobile AP MLD operation. A method comprises determining whether a second AP operating on a non-primary link forms an NSTR link pair with a first AP operating on a primary link; determining whether a second STA operating on the non-primary link forms an NSTR pair with a first STA operating on the primary link; transmitting frames on the non-primary link without synchronizing PPDUs with a frame transmission on the primary link when: the second AP does not form the NSTR link pair with the first AP, and the second STA does not form the NSTR pair with the first STA; and transmitting frames on the non-primary link by synchronizing the PPDUs with the frame transmission on the primary link when: the second AP forms the NSTR link pair with the first AP, or the second STA forms the NSTR pair with the first STA.

20 Claims, 9 Drawing Sheets

(51) Int. Cl.
*H04W 88/02* (2009.01)
*H04W 88/08* (2009.01)

(56) References Cited

U.S. PATENT DOCUMENTS

| | | |
|---|---|---|
| 2021/0282186 A1 | 9/2021 | Cherian et al. |
| 2022/0095401 A1* | 3/2022 | Lu ........................ H04L 5/0053 |
| 2022/0167444 A1 | 5/2022 | Jang et al. |
| 2022/0312506 A1* | 9/2022 | Xia ................... H04W 74/0891 |
| 2023/0180161 A1* | 6/2023 | Lu ..................... H04W 52/0216 |
| 2023/0224814 A1 | 7/2023 | Kim et al. |

OTHER PUBLICATIONS

Asterjadhi, "Proposed Resolutions to CIDs specified in 11-21/218r0", IEEE P802.11 Wireless LANs, 21/0915r0, Jul. 2021, 52 pages.
Au, "Compendium of straw polls and potential changes to the Specification Framework Document", IEEE P802.11 Wireless LANs, 20/0566r95, Nov. 2020, 274 pages.
International Search Report and Written Opinion issued May 4, 2023 regarding International Application No. PCT/KR2023/001558, 7 pages.
Li et al., "CR of NSTR Capability update", doc.: IEEE 802.11-18/0149r00, Jan. 2022, 6 pages.
Lu, "Resolution for Miscellaneous CIDs related to Clause 35.3.18 (CC36)", doc.: IEEE 802.11-21/1786r0, Dec. 2021, 10 pages.
IEEE P802.11be-D2.1, "Part 11: Wireless LAN Medium Access Control (MAC) and Physical Layer (PHY) Specifications, Amendment 8: Enhancements for extremely high throughput (EHT)", Jul. 2022, 885 pages.

* cited by examiner

METHOD AND APPARATUS FOR MOBILE AP MLD OPERATION

CROSS-REFERENCE TO RELATED APPLICATION AND CLAIM OF PRIORITY

This application claims priority under 35 U. S. C. § 119(e) to U.S. Provisional Patent Application No. 63/306,853 filed on Feb. 4, 2022, which is hereby incorporated by reference in their entirety.

TECHNICAL FIELD

This disclosure relates generally to transmission efficiency in wireless communications systems that include multi-link devices. Embodiments of this disclosure relate to methods and apparatuses for facilitating mobile AP MLD operation.

BACKGROUND

Wireless local area network (WLAN) technology allows devices to access the internet in the 2.4 GHz, 5 GHz, 6 GHz, or 60 GHz frequency bands. WLANs are based on the Institute of Electrical and Electronic Engineers (IEEE) 802.11 standards. The IEEE 802.11 family of standards aim to increase speed and reliability and to extend the operating range of wireless networks.

Multi-link operation (MLO) is a feature that is currently being developed by the standards body for next generation extremely high throughput (EHT) Wi-Fi systems in IEEE 802.11be. The Wi-Fi devices that support MLO are referred to as multi-link devices (MLD). With MLO, it is possible for a non-AP MLD to discover, authenticate, associate, and set up multiple links with an AP MLD. Channel access and frame exchange is possible on each link between the AP MLD and non-AP MLD.

SUMMARY

Embodiments of the present disclosure provide methods and apparatuses for facilitating mobile AP MLD operation.

In one embodiment, a non-AP MLD is provided, comprising stations (STAs) comprising transceivers, respectively, a first of the STAs configured to form a primary link with a first AP of a mobile AP MLD, a second of the STAs configured to form a non-primary link with a second AP of the mobile AP MLD. The non-AP MLD further comprises a processor operably coupled to the STAs, the processor configured to: determine whether the second AP operating on the non-primary link forms a non-simultaneous transmit receive (NSTR) link pair with the first AP operating on the primary link; and determine whether the second STA operating on the non-primary link forms an NSTR pair with the first STA operating on the primary link, wherein the second STA is further configured to: transmit frames on the non-primary link without synchronizing physical layer protocol data units (PPDUs) with a frame transmission on the primary link when: the second AP operating on the non-primary link does not form the NSTR link pair with the first AP operating on the primary link, and the second STA operating on the non-primary link does not form the NSTR pair with the first STA operating on the primary link, and transmit frames on the non-primary link by synchronizing the PPDUs with the frame transmission on the primary link when: the second AP operating on the non-primary link forms the NSTR link pair with the first AP operating on the primary link, or the second STA operating on the non-primary link forms the NSTR pair with the first STA operating on the primary link.

In another embodiment, an AP MLD is provided, comprising APs comprising transceivers, respectively, a first of the APs configured to form a primary link with a first STA of a non-AP MLD, a second of the APs configured to form a non-primary link with a second STA of the non-AP MLD. The AP MLD further comprises a processor operably coupled to the APs, the processor configured to instruct the APs to form the primary link and the secondary link; determine whether the second AP operating on the non-primary link forms an NSTR link pair with the first AP operating on the primary link; and determine whether the second STA operating on the non-primary link forms an NSTR pair with the first STA operating on the primary link, wherein the second AP is further configured to: transmit frames on the non-primary link without synchronizing PPDUs with a frame transmission on the primary link when: the second AP operating on the non-primary link does not form the NSTR link pair with the first AP operating on the primary link, and the second STA operating on the non-primary link does not form the NSTR pair with the first STA operating on the primary link, and transmit frames on the non-primary link by synchronizing the PPDUs with the frame transmission on the primary link when: the second AP operating on the non-primary link forms the NSTR link pair with the first AP operating on the primary link, or the second STA operating on the non-primary link forms the NSTR pair with the first STA operating on the primary link.

In another embodiment, a method of wireless communication is provided, performed by a non-AP MLD that comprises STAs comprising transceivers, respectively, a first of the STAs configured to form a primary link with a first AP of a mobile AP MLD, a second of the STAs configured to form a non-primary link with a second AP of the mobile AP MLD. The method comprises determining whether the second AP operating on the non-primary link forms a non-simultaneous transmit receive NSTR link pair with the first AP operating on the primary link; determining whether the second STA operating on the non-primary link forms an NSTR pair with the first STA operating on the primary link; transmitting frames on the non-primary link without synchronizing PPDUs with a frame transmission on the primary link when: the second AP operating on the non-primary link does not form the NSTR link pair with the first AP operating on the primary link, and the second STA operating on the non-primary link does not form the NSTR pair with the first STA operating on the primary link, and transmitting frames on the non-primary link by synchronizing the PPDUs with the frame transmission on the primary link when: the second AP operating on the non-primary link forms the NSTR link pair with the first AP operating on the primary link, or the second STA operating on the non-primary link forms the NSTR pair with the first STA operating on the primary link.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. As used herein, such terms as "1st" and "2nd," or "first" and "second" may be used to simply distinguish a corresponding component from another and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure provide mechanisms and frameworks for facilitating mobile AP MLD operation.

Figure 1:
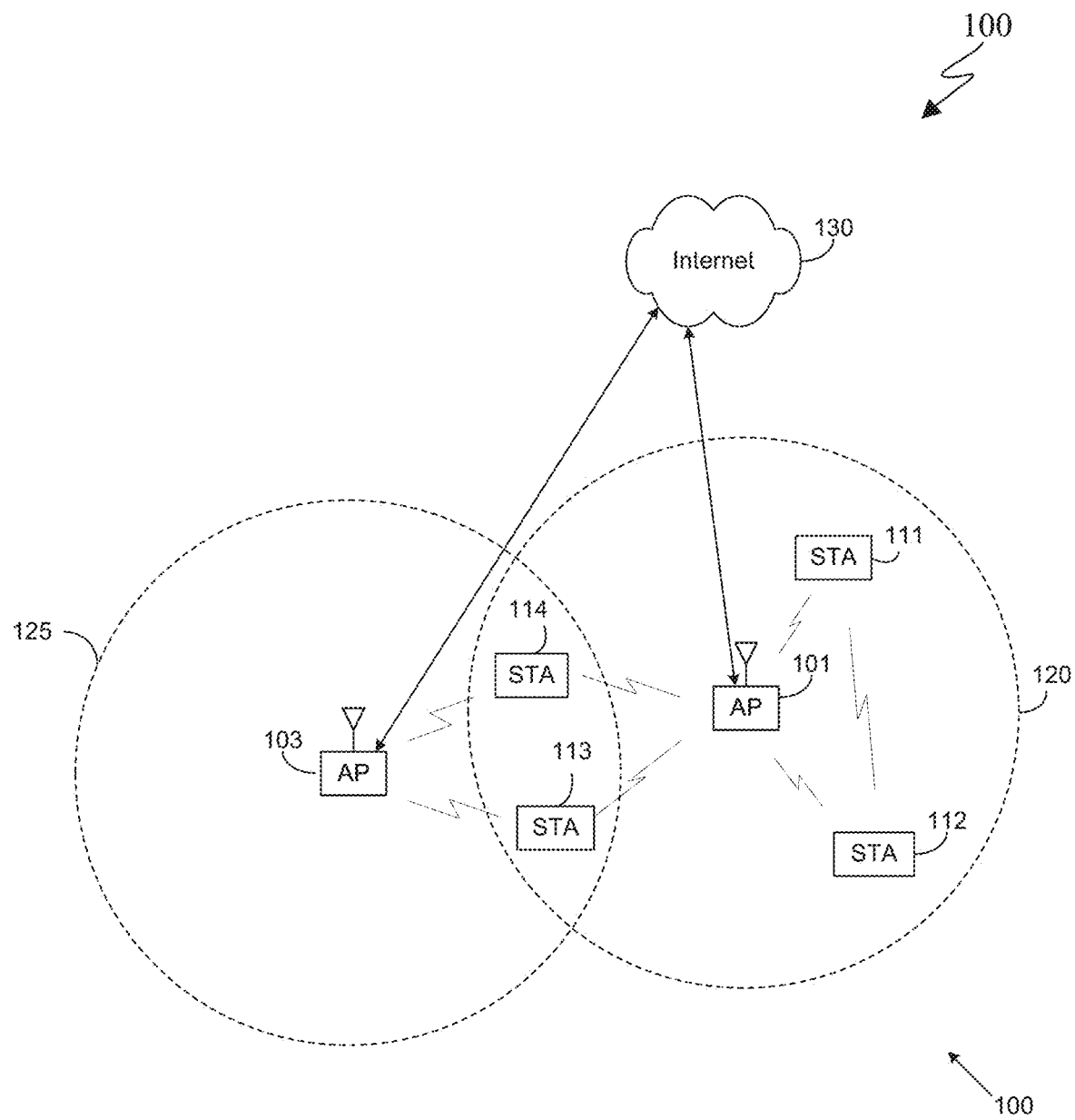
FIG. 1 illustrates an example wireless network according to various embodiments of the present disclosure.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of this disclosure.

The wireless network 100 includes APs 101 and 103. The APs 101 and 103 communicate with at least one network 130, such as the Internet, a proprietary Internet Protocol (IP) network, or other data network. The AP 101 provides wireless access to the network 130 for a plurality of STAs 111-114 within a coverage area 120 of the AP 101. The APs 101-103 may communicate with each other and with the STAs 111-114 using Wi-Fi or other WLAN communication techniques.

Depending on the network type, other well-known terms may be used instead of "access point" or "AP," such as "router" or "gateway." For the sake of convenience, the term "AP" is used in this disclosure to refer to network infrastructure components that provide wireless access to remote terminals. In WLAN, given that the AP also contends for the wireless channel, the AP may also be referred to as a STA (e.g., an AP STA). Also, depending on the network type, other well-known terms may be used instead of "station" or "STA," such as "mobile station," "subscriber station," "remote terminal," "user equipment," "wireless terminal," or "user device." For the sake of convenience, the terms "station" and "STA" are used in this disclosure to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.). This type of STA may also be referred to as a non-AP STA.

In various embodiments of this disclosure, each of the APs 101 and 103 and each of the STAs 111-114 may be an MLD. In such embodiments, APs 101 and 103 may be AP MLDs, and STAs 111-114 may be non-AP MLDs. Each MLD is affiliated with more than one STA. For convenience of explanation, an AP MLD is described herein as affiliated with more than one AP (e.g., more than one AP STA), and a non-AP MLD is described herein as affiliated with more than one STA (e.g., more than one non-AP STA).

Dotted lines show the approximate extents of the coverage areas 120 and 125, which are shown as approximately circular for the purposes of illustration and explanation only. It should be clearly understood that the coverage areas associated with APs, such as the coverage areas 120 and 125, may have other shapes, including irregular shapes, depending upon the configuration of the APs and variations in the radio environment associated with natural and man-made obstructions.

As described in more detail below, one or more of the APs may include circuitry and/or programming for facilitating mobile AP MLD operation. Although FIG. 1 illustrates one example of a wireless network 100, various changes may be made to FIG. 1. For example, the wireless network 100 could include any number of APs and any number of STAs in any suitable arrangement. Also, the AP 101 could communicate directly with any number of STAs and provide those STAs with wireless broadband access to the network 130. Similarly, each AP 101-103 could communicate directly with the network 130 and provide STAs with direct wireless broadband access to the network 130. Further, the APs 101 and/or 103 could provide access to other or additional external networks, such as external telephone networks or other types of data networks.

Figure 2A:
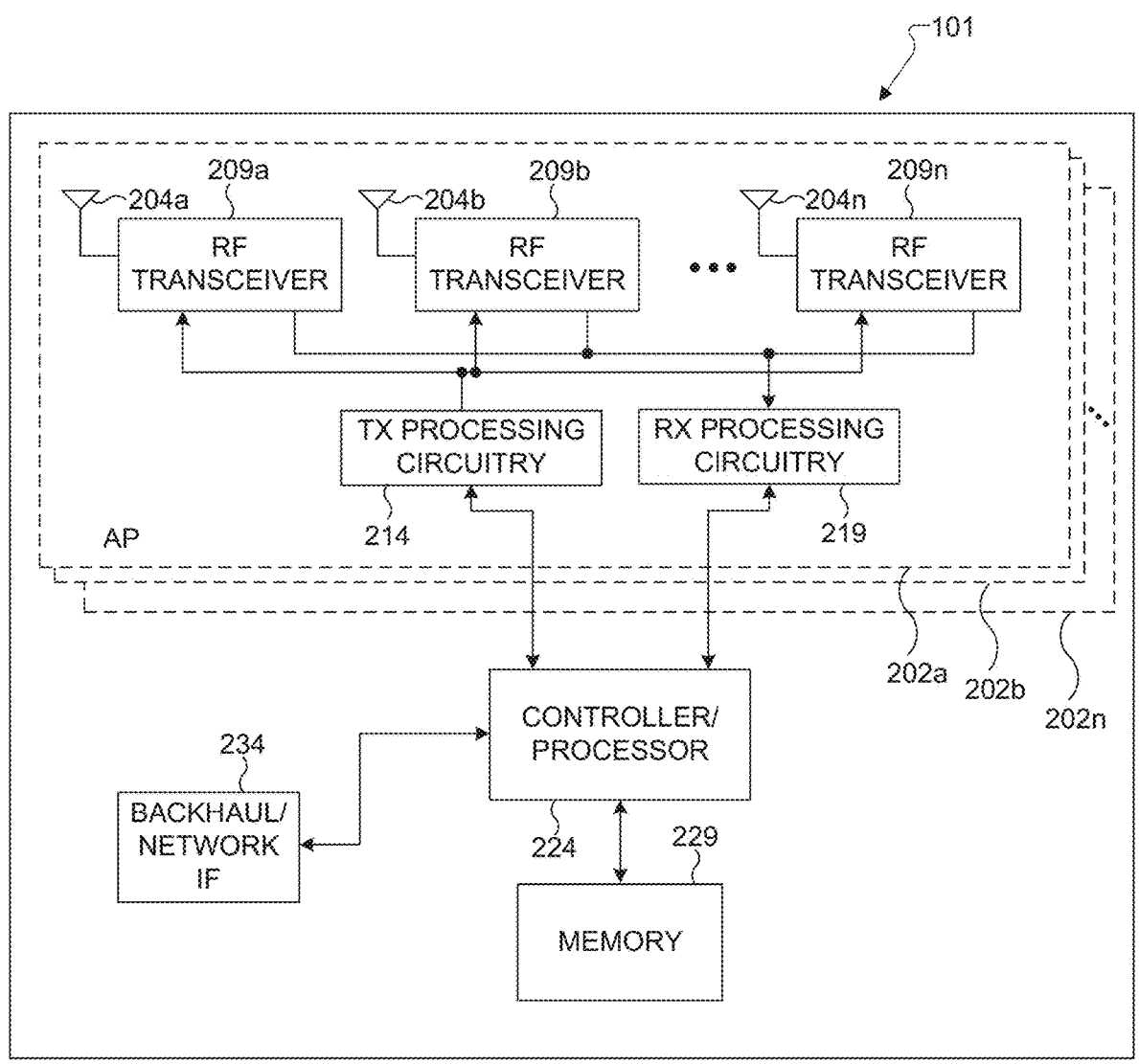
FIG. 2A illustrates an example AP according to various embodiments of the present disclosure.

FIG. 2A illustrates an example AP 101 according to various embodiments of the present disclosure. The embodiment of the AP 101 illustrated in FIG. 2A is for illustration only, and the AP 103 of FIG. 1 could have the same or similar configuration. In the embodiments discussed herein below, the AP 101 is an AP MLD. However, APs come in a wide variety of configurations, and FIG. 2A does not limit the scope of this disclosure to any particular implementation of an AP.

The AP MLD 101 is affiliated with multiple APs 202a-202n (which may be referred to, for example, as AP1-APn). Each of the affiliated APs 202a-202n includes multiple antennas 204a-204n, multiple RF transceivers 209a-209n, transmit (TX) processing circuitry 214, and receive (RX) processing circuitry 219. The AP MLD 101 also includes a controller/processor 224, a memory 229, and a backhaul or network interface 234.

The illustrated components of each affiliated AP 202a-202n may represent a physical (PHY) layer and a lower media access control (LMAC) layer in the open systems interconnection (OSI) networking model. In such embodiments, the illustrated components of the AP MLD 101 represent a single upper MAC (UMAC) layer and other higher layers in the OSI model, which are shared by all of the affiliated APs 202a-202n.

For each affiliated AP 202a-202n, the RF transceivers 209a-209n receive, from the antennas 204a-204n, incoming RF signals, such as signals transmitted by STAs in the network 100. In some embodiments, each affiliated AP 202a-202n operates at a different bandwidth, e.g., 2.4 GHz, 5 GHz, or 6 GHz, and accordingly the incoming RF signals received by each affiliated AP may be at a different frequency of RF. The RF transceivers 209a-209n down-convert the incoming RF signals to generate IF or baseband signals. The IF or baseband signals are sent to the RX processing circuitry 219, which generates processed baseband signals by filtering, decoding, and/or digitizing the baseband or IF signals. The RX processing circuitry 219 transmits the processed baseband signals to the controller/processor 224 for further processing.

For each affiliated AP 202a-202n, the TX processing circuitry 214 receives analog or digital data (such as voice data, web data, e-mail, or interactive video game data) from the controller/processor 224. The TX processing circuitry 214 encodes, multiplexes, and/or digitizes the outgoing baseband data to generate processed baseband or IF signals. The RF transceivers 209a-209n receive the outgoing processed baseband or IF signals from the TX processing circuitry 214 and up-convert the baseband or IF signals to RF signals that are transmitted via the antennas 204a-204n. In embodiments wherein each affiliated AP 202a-202n operates at a different bandwidth, e.g., 2.4 GHz, 5 GHz, or 6 GHz, the outgoing RF signals transmitted by each affiliated AP may be at a different frequency of RF.

The controller/processor 224 can include one or more processors or other processing devices that control the overall operation of the AP MLD 101. For example, the controller/processor 224 could control the reception of forward channel signals and the transmission of reverse channel signals by the RF transceivers 209a-209n, the RX processing circuitry 219, and the TX processing circuitry 214 in accordance with well-known principles. The controller/processor 224 could support additional functions as well, such as more advanced wireless communication functions. For instance, the controller/processor 224 could support beam forming or directional routing operations in which outgoing signals from multiple antennas 204a-204n are weighted differently to effectively steer the outgoing signals in a desired direction. The controller/processor 224 could also support OFDMA operations in which outgoing signals are assigned to different subsets of subcarriers for different recipients (e.g., different STAs 111-114). Any of a wide variety of other functions could be supported in the AP MLD 101 by the controller/processor 224 including facilitating mobile AP MLD operation. In some embodiments, the controller/processor 224 includes at least one microprocessor or microcontroller. The controller/processor 224 is also capable of executing programs and other processes resident in the memory 229, such as an OS. The controller/processor 224 can move data into or out of the memory 229 as required by an executing process.

The controller/processor 224 is also coupled to the backhaul or network interface 234. The backhaul or network interface 234 allows the AP MLD 101 to communicate with other devices or systems over a backhaul connection or over a network. The interface 234 could support communications over any suitable wired or wireless connection(s). For example, the interface 234 could allow the AP MLD 101 to communicate over a wired or wireless local area network or over a wired or wireless connection to a larger network (such as the Internet). The interface 234 includes any suitable structure supporting communications over a wired or wireless connection, such as an Ethernet or RF transceiver. The memory 229 is coupled to the controller/processor 224. Part of the memory 229 could include a RAM, and another part of the memory 229 could include a Flash memory or other ROM.

As described in more detail below, the AP MLD 101 may include circuitry and/or programming for facilitating mobile AP MLD operation. Although FIG. 2A illustrates one example of AP MLD 101, various changes may be made to FIG. 2A. For example, the AP MLD 101 could include any number of each component shown in FIG. 2A. As a particular example, an AP MLD 101 could include a number of interfaces 234, and the controller/processor 224 could support routing functions to route data between different network addresses. As another particular example, while each affiliated AP 202a-202n is shown as including a single instance of TX processing circuitry 214 and a single instance of RX processing circuitry 219, the AP MLD 101 could include multiple instances of each (such as one per RF transceiver) in one or more of the affiliated APs 202a-202n. Alternatively, only one antenna and RF transceiver path may be included in one or more of the affiliated APs 202a-202n, such as in legacy APs. Also, various components in FIG. 2A could be combined, further subdivided, or omitted and additional components could be added according to particular needs.

Figure 2B:
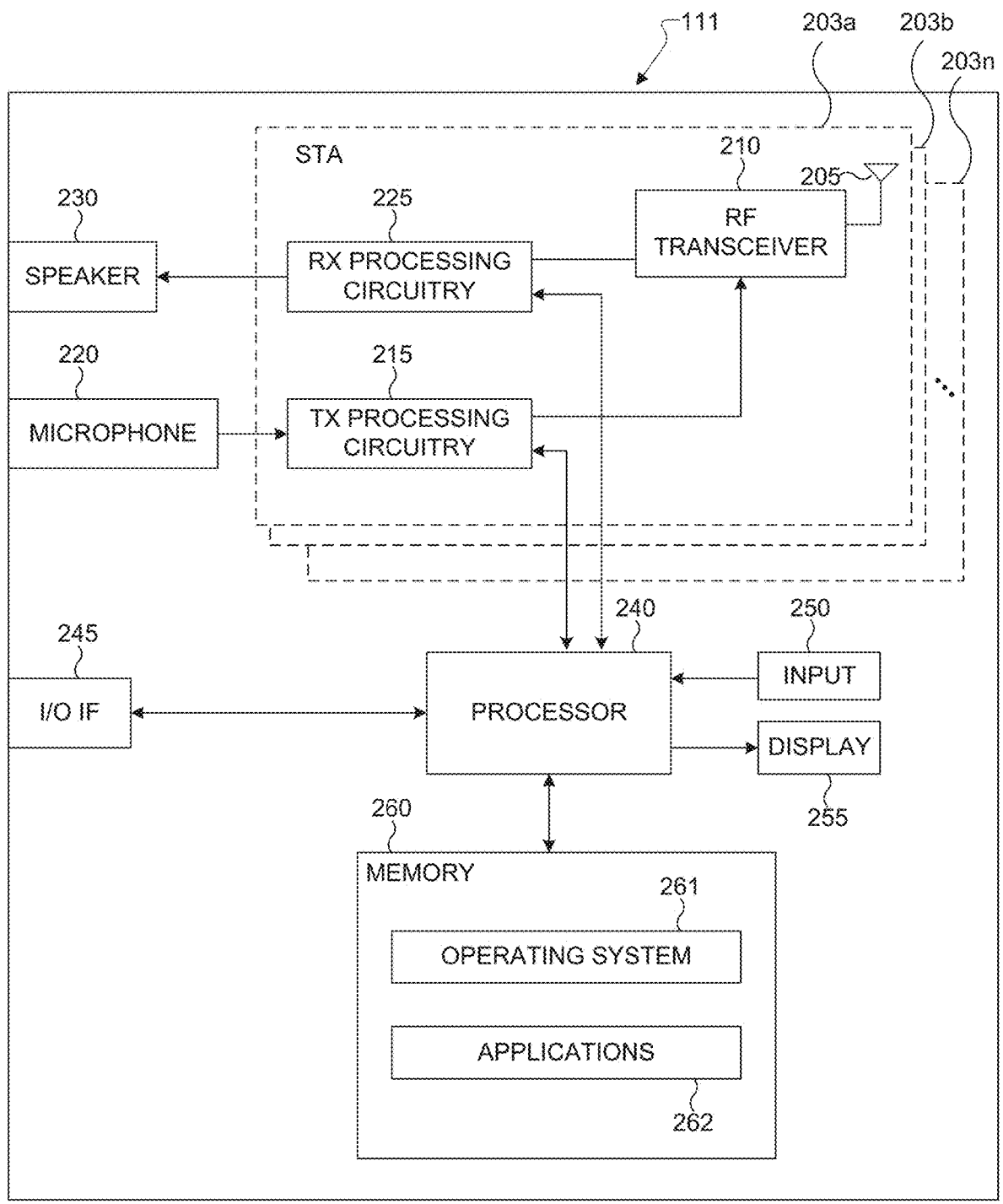
FIG. 2B illustrates an example STA according to various embodiments of this disclosure.

FIG. 2B illustrates an example STA 111 according to various embodiments of this disclosure. The embodiment of the STA 111 illustrated in FIG. 2B is for illustration only, and the STAs 111-115 of FIG. 1 could have the same or similar configuration. In the embodiments discussed herein below, the STA 111 is a non-AP MLD. However, STAs come in a wide variety of configurations, and FIG. 2B does not limit the scope of this disclosure to any particular implementation of a STA.

The non-AP MLD 111 is affiliated with multiple STAs 203a-203n (which may be referred to, for example, as STA1-STAn). Each of the affiliated STAs 203a-203n includes antenna(s) 205, a radio frequency (RF) transceiver 210, TX processing circuitry 215, and receive (RX) processing circuitry 225. The non-AP MLD 111 also includes a microphone 220, a speaker 230, a controller/processor 240, an input/output (I/O) interface (IF) 245, a touchscreen 250, a display 255, and a memory 260. The memory 260 includes an operating system (OS) 261 and one or more applications 262.

The illustrated components of each affiliated STA 203a-203n may represent a PHY layer and an LMAC layer in the OSI networking model. In such embodiments, the illustrated components of the non-AP MLD 111 represent a single UMAC layer and other higher layers in the OSI model, which are shared by all of the affiliated STAs 203a-203n.

For each affiliated STA 203a-203n, the RF transceiver 210 receives, from the antenna(s) 205, an incoming RF signal transmitted by an AP of the network 100. In some embodiments, each affiliated STA 203a-203n operates at a different bandwidth, e.g., 2.4 GHz, 5 GHz, or 6 GHz, and accordingly the incoming RF signals received by each affiliated STA may be at a different frequency of RF. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the controller/processor 240 for further processing (such as for web browsing data).

For each affiliated STA 203a-203n, the TX processing circuitry 215 receives analog or digital voice data from the microphone 220 or other outgoing baseband data (such as web data, e-mail, or interactive video game data) from the controller/processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna(s) 205. In embodiments wherein each affiliated STA 203a-203n operates at a different bandwidth, e.g., 2.4 GHz, 5 GHz, or 6 GHz, the outgoing RF signals transmitted by each affiliated STA may be at a different frequency of RF.

The controller/processor 240 can include one or more processors and execute the basic OS program 261 stored in the memory 260 in order to control the overall operation of the non-AP MLD 111. In one such operation, the main controller/processor 240 controls the reception of forward channel signals and the transmission of reverse channel signals by the RF transceiver 210, the RX processing circuitry 225, and the TX processing circuitry 215 in accordance with well-known principles. The main controller/processor 240 can also include processing circuitry configured to facilitate mobile AP MLD operation. In some embodiments, the controller/processor 240 includes at least one microprocessor or microcontroller.

The controller/processor 240 is also capable of executing other processes and programs resident in the memory 260, such as operations for facilitating mobile AP MLD operation. The controller/processor 240 can move data into or out of the memory 260 as required by an executing process. In some embodiments, the controller/processor 240 is configured to execute a plurality of applications 262, such as applications for facilitating mobile AP MLD operation. The controller/processor 240 can operate the plurality of applications 262 based on the OS program 261 or in response to a signal received from an AP. The main controller/processor 240 is also coupled to the I/O interface 245, which provides non-AP MLD 111 with the ability to connect to other devices such as laptop computers and handheld computers. The I/O interface 245 is the communication path between these accessories and the main controller 240.

The controller/processor 240 is also coupled to the touchscreen 250 and the display 255. The operator of the non-AP MLD 111 can use the touchscreen 250 to enter data into the non-AP MLD 111. The display 255 may be a liquid crystal display, light emitting diode display, or other display capable of rendering text and/or at least limited graphics, such as from web sites. The memory 260 is coupled to the controller/processor 240. Part of the memory 260 could include a random-access memory (RAM), and another part of the memory 260 could include a Flash memory or other read-only memory (ROM).

Although FIG. 2B illustrates one example of non-AP MLD 111, various changes may be made to FIG. 2B. For example, various components in FIG. 2B could be combined, further subdivided, or omitted and additional components could be added according to particular needs. In particular examples, one or more of the affiliated STAs 203*a*-203*n* may include any number of antenna(s) 205 for MIMO communication with an AP 101. In another example, the non-AP MLD 111 may not include voice communication or the controller/processor 240 could be divided into multiple processors, such as one or more central processing units (CPUs) and one or more graphics processing units (GPUs). Also, while FIG. 2B illustrates the non-AP MLD 111 configured as a mobile telephone or smartphone, non-AP MLDs can be configured to operate as other types of mobile or stationary devices.

Figure 3:
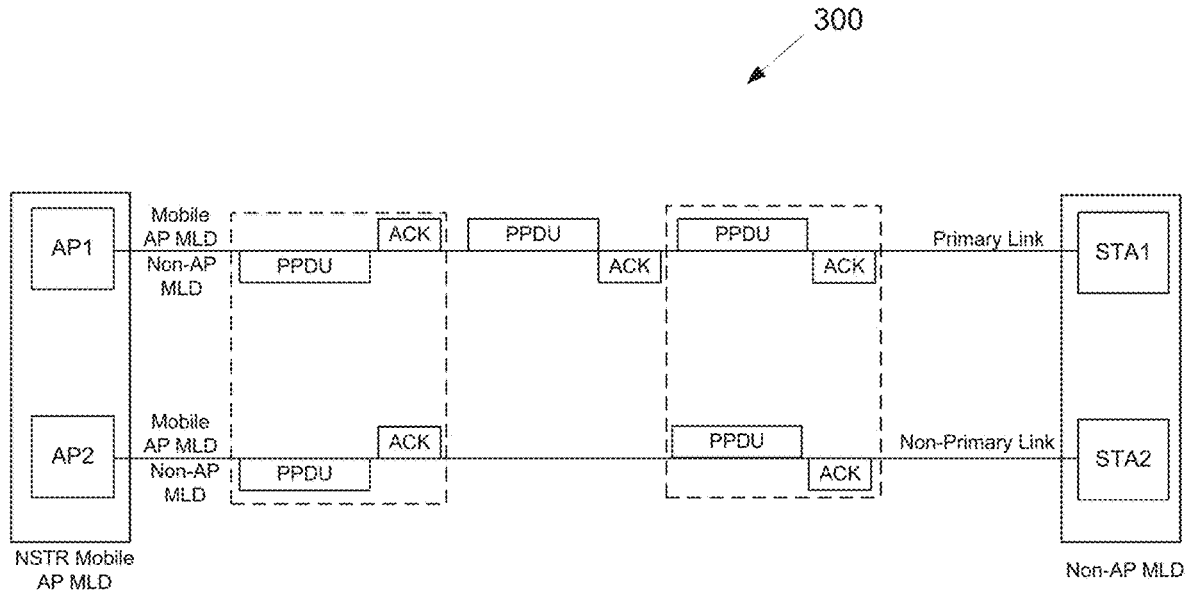
FIG. 3 illustrates an example of a synchronous operation of an NSTR Mobile AP MLD according to embodiments of the present disclosure.

FIG. 3 illustrates an example of a synchronous operation of a non-simultaneous transmit receive (NSTR) Mobile AP MLD 300 according to embodiments of the present disclosure. The embodiment of the synchronous operation of an NSTR Mobile AP MLD 300 shown in FIG. 3 is for illustration only. Other embodiments of the synchronous operation of an NSTR Mobile AP MLD 300 could be used without departing from the scope of this disclosure.

An AP MLD is typically able to simultaneously transmit and receive over all of its links. However, 802.11be standards define a special AP MLD, namely, an NSTR Mobile AP MLD, which can have NSTR link pairs. As illustrated in FIG. 3, two kinds of links are defined for an NSTR Mobile AP MLD—Primary link and non-primary link. A Beacon and Probe response frame can only be sent over the Primary link and cannot be sent over the non-primary link. Moreover, when transmitting physical layer protocol data units (PPDUs) over the non-primary link, the AP affiliated with the NSTR Mobile AP MLD that is operating on the primary link or a non-AP STA affiliated with a non-AP MLD that is associated with the NSTR Mobile AP MLD and operating on the non-primary link, needs to align the PPDU with the PPDU transmitted over the primary link.

Figure 4:
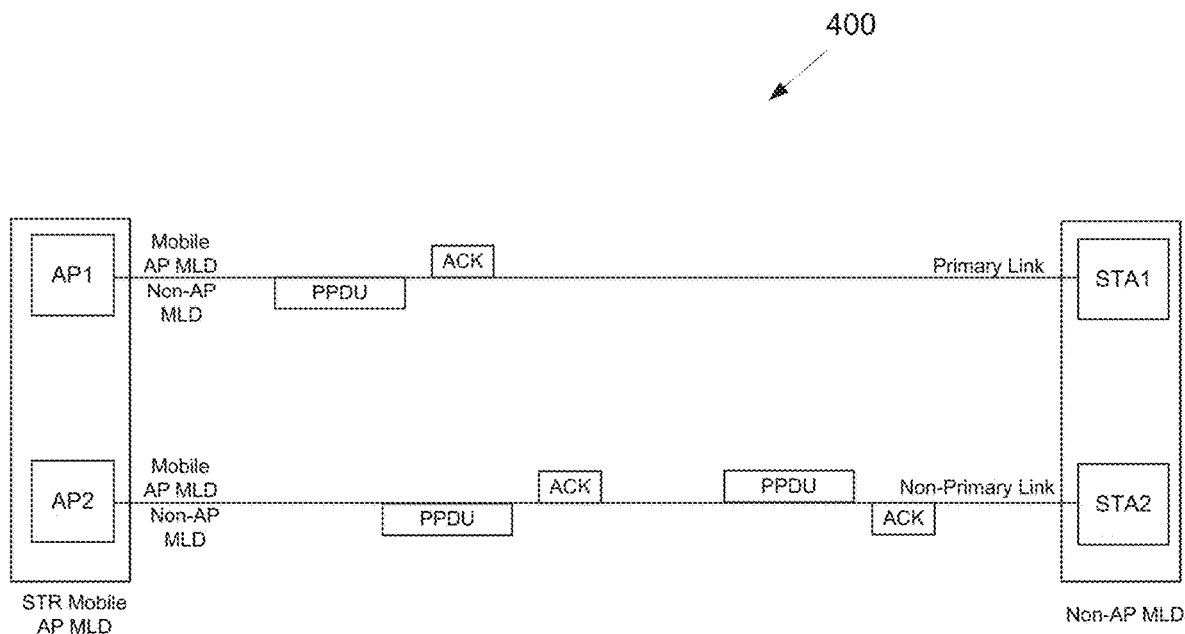
FIG. 4 illustrates an example of an asynchronous operation of an STR Mobile AP MLD according to embodiments of the present disclosure.

FIG. 4 illustrates an example of an asynchronous operation of an STR Mobile AP MLD 400 according to embodiments of the present disclosure. The embodiment of the asynchronous operation of an STR Mobile AP MLD 400 shown in FIG. 4 is for illustration only. Other embodiments of the asynchronous operation of an STR Mobile AP MLD 400 could be used without departing from the scope of this disclosure.

According to one embodiment, a Mobile AP MLD can have two links—a primary link and a non-primary link, where the AP affiliated with the Mobile AP MLD and operating on the non-primary link does not form an NSTR link pair with the AP affiliated with the same Mobile AP MLD and operating on the primary link. This kind of Mobile AP MLD can be referred to as a simultaneous transmit receive (STR) Mobile AP MLD. For an STR Mobile AP MLD, the AP affiliated with the Mobile AP MLD and operating on the non-primary link or the associated STA affiliated with a non-AP MLD and operating on the non-primary link can transmit frames on the non-primary link without the requirement of synchronizing PPDUs with the frame transmission on the primary link unless the STA affiliated with the non-AP MLD and operating on the non-primary link is also part of an NSTR link pair with other STA affiliated with the same non-AP MLD, in which case, both the STR Mobile AP MLD and the non-AP MLD will follow the NSTR PPDU synchronization procedure defined in IEEE 802.11be specification in order to ensure that there is no NSTR interference caused at the non-AP MLD. An illustration of an STR Mobile AP MLD is shown in FIG. 4, illustrating asynchronous transmission on the non-primary link for an STR Mobile AP MLD.

According to one embodiment, for an STR Mobile AP MLD, the Beacon and Probe Response frame is transmitted only on the primary link, and the AP affiliated with the STR Mobile AP MLD does not send any Beacon or Probe Response frame on the non-primary link. A STA affiliated with a non-AP MLD that is associated with an STR Mobile AP MLD and operating on the non-primary link receives its TSF timer information from the Beacon sent to the other STA affiliated with the same non-AP MLD and operating on the primary link. A STA affiliated with a non-AP MLD that is associated with an STR Mobile AP MLD and operating on the primary link may send a multilink (ML) Probe Request frame to the STR Mobile AP MLD in order to request for complete profile information of the other AP affiliated with the STR Mobile AP MLD and operating on the non-primary link.

According to one embodiment, an AP affiliated with an STR Mobile AP MLD and operating on the primary link incudes a Reduced Neighbor Report element, in the Beacon frame that it transmits, corresponding to the other AP affiliated with the same STR Mobile AP MLD and operating on the non-primary link. According to one embodiment, in the transmitted Reduced Neighbor Report (RNR) element corresponding to the reported AP (i.e., AP2) affiliated with the STR Mobile AP MLD and operating on the non-primary link, the Target Beacon Transmit Time (TBTT) Information Field Type subfield in the TBTT Information Header subfield in the Neighbor AP Information Fields field of the RNR element is set to 1 to indicate that the reported AP is affiliated with the STR Mobile AP MLD and operating on the non-primary link. Note that AP1 is the reporting AP. According to this embodiment, the TBTT Information Length subfield in the TBTT Information Header subfield in the Neighbor AP Information Fields field of the RNR element is set to either 0 (according to one embodiment), 3 (according to another embodiment), 14 (according to another embodiment), or 15 (according to another embodiment)—these values would indicate that only the MLD Parameters subfield is present in the TBTT Information field of the TBTT Information Set field of the Neighbor AP Information Fields of the RNR element (see Table I).

According to another embodiment, in the transmitted Reduced Neighbor Report (RNR) element corresponding to the reported AP affiliated with the STR Mobile AP MLD and operating on the non-primary link, the TBTT Information Field Type subfield in the TBTT Information Header subfield in the Neighbor AP Information Fields field of the RNR element is set to 0. According to this embodiment, the TBTT Information Length subfield in the TBTT Information Header subfield in the Neighbor AP Information Fields field of the RNR element is set to either 0 (according to one embodiment), 3 (according to another embodiment), 14 (according to another embodiment), or 15 (according to another embodiment)—these values would indicate that only MLD Parameters subfield is present in the TBTT Information field of the TBTT Information Set field of the Neighbor AP Information Fields of the RNR element (see Table I). The combined configuration of the TBTT Information Field Type and TBTT Information Length subfields would indicate that the reported AP is affiliated with the STR Mobile AP MLD and operating on the non-primary link.

TABLE I

TBTT Information field contents for indication of AP operating on non-primary link

| TBTT Information Length subfield value | TBTT Information field contents |
| --- | --- |
| 1 | The Neighbor AP TBTT Offset subfield |
| 2 | The Neighbor AP TBTT Offset subfield and the BSS Parameters subfield |
| 4 | The Neighbor AP TBTT Offset subfield and the MLD Parameters subfield |
| 5 | The Neighbor AP TBTT Offset subfield and the Short SSID subfield |
| 6 | The Neighbor AP TBTT Offset subfield, the Short-SSID sub-field, and the BSS Parameters subfield |
| 7 | The Neighbor AP TBTT Offset subfield and the BSSID subfield |
| 8 | The Neighbor AP TBTT Offset subfield, the BSSID subfield, and the BSS Parameters subfield |
| 9 | The Neighbor AP TBTT Offset subfield, the BSSID subfield, theBSS Parameters subfield, and the 20 MHz PSD subfield |
| 10 | The Neighbor AP TBTT Offset subfield, the BSSID subfield, and the MLD Parameter subfield |
| 11 | The Neighbor AP TBTT Offset subfield, the BSSID subfield andthe Short SSID subfield |
| 12 | The Neighbor AP TBTT Offset subfield, the BSSID subfield, theShort-SSID subfield and the BSS Parameters subfield |
| 0, 3, 15 | Reserved |
| 13 | The Neighbor AP TBTT Offset subfield, the BSSID subfield, theShort-SSID subfield, the BSS Parameters subfield and the 20 MHz PSD subfield |
| 14 | MLD Parameters subfield |
| 16 | The Neighbor AP TBTT Offset subfield, the BSSID subfield, theShort-SSID subfield, the BSS Parameters subfield, the 20 MHz PSD subfield and the MLD Parameters subfield |
| 17-255 | The first 16 octets of the field contain the Neighbor AP TBTT Offset subfield, the BSSID subfield, the Short-SSID subfield the BSS Parameters subfield,and -the 20 MHz PSD subfield and the MLD Parameters subfield (i.e., same contents as when the length of the TBTT Information field is 16). The remaining octets are reserved |

According to one embodiment, while an STR Mobile AP MLD is associated with any non-AP MLD, in order to indicate the change in the designation of the primary link and the non-primary link, the STR Mobile AP MLD includes an RNR element in the Beacon frame it transmits and increments the BSS Parameters Change Count subfield in the MLD Parameters subfield in the TBTT Information field in the TBTT Information Set field in the Neighbor AP Information Fields field of the RNR element and includes a Mobile AP MLD Link Change element in the Beacon frame it transmits.

Figure 5:
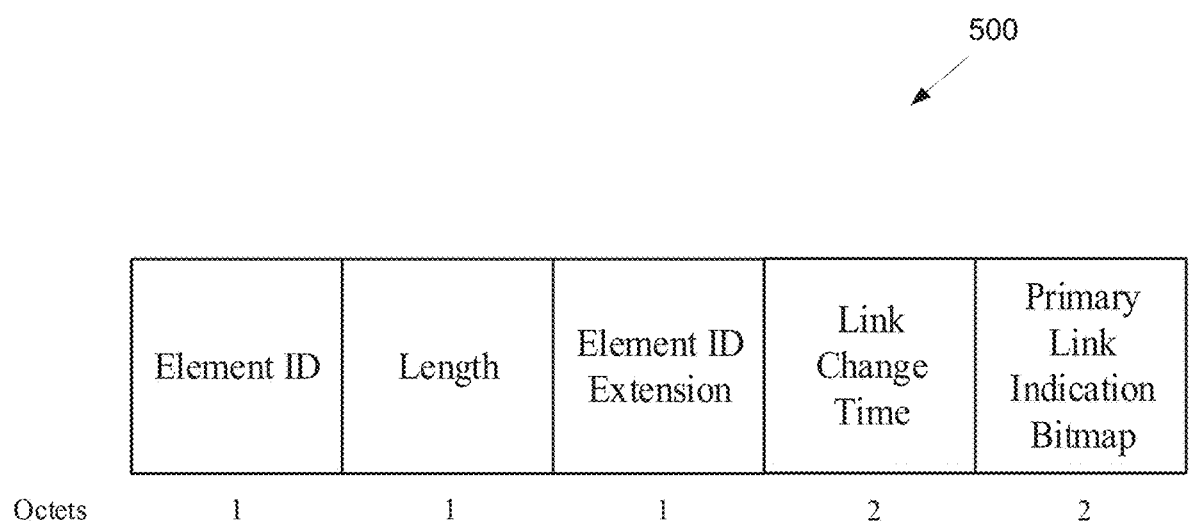
FIG. 5 illustrates an example format of the mobile AP MLD link change element according to embodiments of the present disclosure.

FIG. 5 illustrates an example format of the mobile AP MLD link change element 500 according to embodiments of the present disclosure. The embodiment of the format of the mobile AP MLD link change element 500 shown in FIG. 5 is for illustration only. Other embodiments of the format of the mobile AP MLD link change element 500 could be used without departing from the scope of this disclosure.

As illustrated in FIG. 5, the Link Change Time subfield in the Mobile AP MLD Link Change element indicates the time in TBTT from the current TBTT till the changes in the primary link designation happens. The Primary Link Indication Bitmap subfield in the Mobile AP MLD Link Change element indicates the primary and non-primary links of the STR Mobile AP MLD. If a bit corresponding to the Link ID in the Primary Link Indication Bitmap subfield is set to 1, it would indicate that the corresponding link will be a primary link from the TBTT indicated in Link Change Time subfield of the Mobile AP MLD Link Change element. If a bit corresponding to the Link ID in the Primary Link Indication Bitmap subfield is set to 0, it would indicate that the corresponding link will be a non-primary link from the TBTT indicated in Link Change Time subfield of the Mobile AP MLD Link Change element.

According to another embodiment, in another format, one or more subfields in the Mobile AP MLD Link Change element shown in FIG. 5 may be absent.

According to one embodiment, while an STR Mobile AP MLD is associated with any non-AP MLD, in order to indicate the change in the designation of the primary link and the non-primary link, the STR Mobile AP MLD includes a Basic Multi-Link element in a Beacon or Probe Response frame and increments the BSS Parameters Change Count subfield in the Common Info field of the Basic Multi-Link element and includes a Mobile AP MLD Link Change element in the corresponding Beacon or Probe Response frame it transmits.

According to one embodiment, for indicating changes in designation of primary links of an STR Mobile AP MLD, the STR Mobile AP MLD keeps including the Mobile AP MLD Link Change element in the Beacon frames for as many TBTT as needed in order to ensure that all the associated STAs are awake to receive the Beacon frame containing the Mobile AP MLD Link Change element.

According to one embodiment, inclusion of the Mobile AP MLD Link Change element in the Beacon frame is considered as a critical update.

According to one embodiment, the NSTR Link Pair Present subfield in the STA Control field of the Per-STA Profile sub-element in the Link Info field of a Multi-Link element transmitted by an STR Mobile AP MLD over either the primary link or the non-primary link is set to 0.

According to one embodiment, the Maximum Number of Simultaneous Links subfield in the MLD Capabilities subfield in the Common Info field of the Basic Multi-Link element is set to a value greater than 0.

Figure 6:
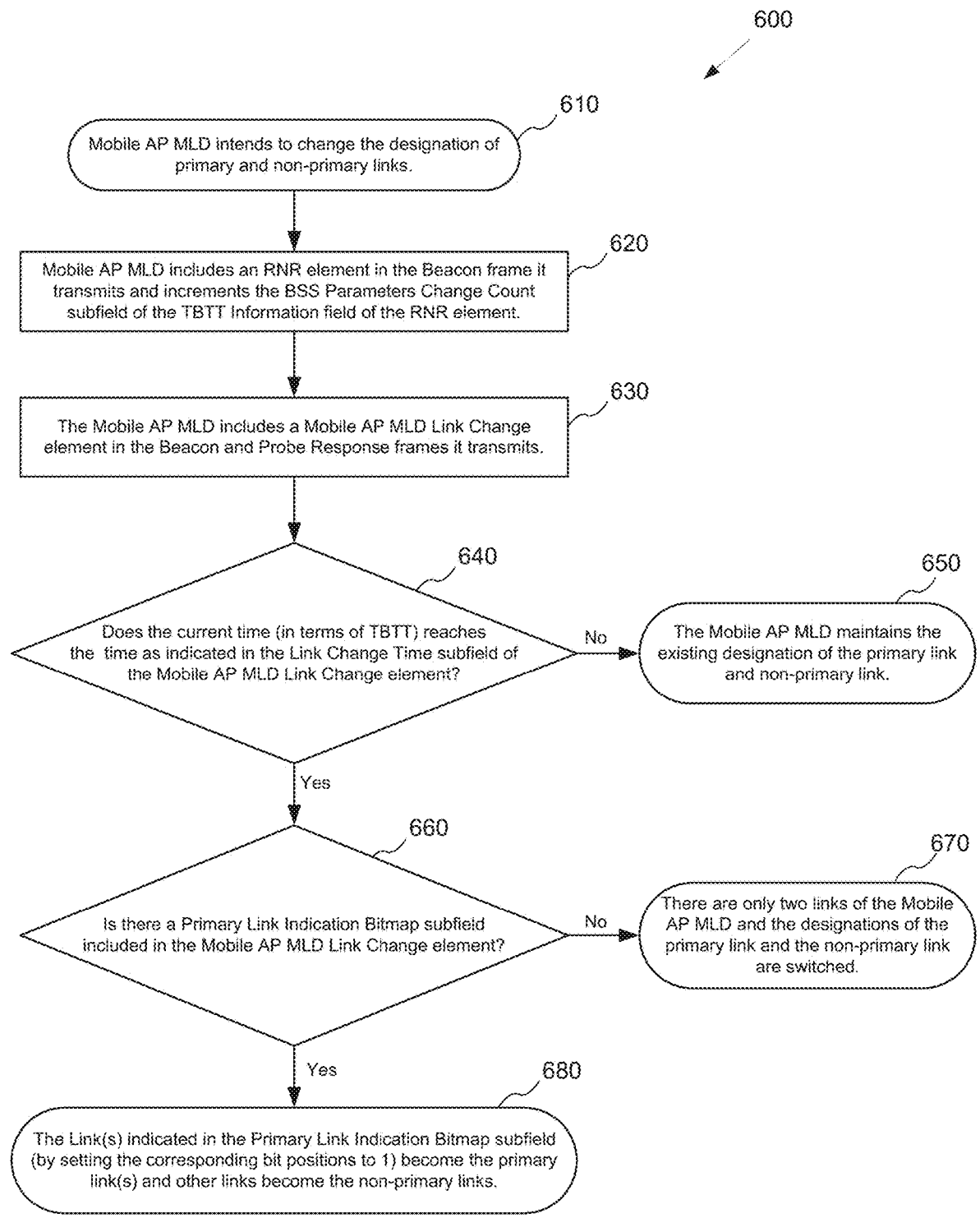
FIG. 6 illustrates an example flowchart of a method for changing the designation of the primary and the non-primary links according to embodiments of the present disclosure.

FIG. 6 illustrates an example flowchart of a method 600 for changing the designation of the primary and the non-primary links as may be performed by a Mobile AP MLD according to embodiments of the present disclosure. The embodiment of the method 600 for changing the designation of the primary and the non-primary links shown in FIG. 6 is for illustration only. Other embodiments of the method 600 for changing the designation of the primary and the non-primary links could be used without departing from the scope of this disclosure.

As illustrated in FIG. 6, the method begins at step 610. At step 610, the Mobile AP MLD intends to change the designation of the primary and non-primary links. At step 620, the Mobile AP MLD includes an RNR element in the Beacon frame that it transmits and increments the BSS Parameters Change Count subfield of the TBTT Information field of the RNR element. At step 630, the Mobile AP MLD includes a Mobile AP MLD Link Change element in the Beacon and Probe Response frame that it transmits. At step 640, the Mobile AP MLD determines whether the current time (in terms of TBTT) reaches the time as indicated in the Link Change Time subfield of the Mobile AP MLD Link Change element. If the current time (in terms of TBTT) does not reach the time as indicated in the Link Change Time subfield of the Mobile AP MLD Link Change element, then at step 650, the Mobile AP MLD maintains the existing designation of the primary link and the non-primary link. If the current time (in terms of TBTT) reaches the time as indicated in the Link Change Time subfield of the Mobile AP MLD Link Change element, then at step 660, the Mobile AP MLD determines whether there is a Primary Link Indication Bitmap subfield included in the Mobile AP MLD Link Change Element. If the Primary Link Indication Bitmap subfield is not included in the Mobile AP MLD Link Change Element, there are only two links of the Mobile AP MLD and at step 670, the Mobile AP MLD switches the designations of the primary link and the non-primary link. If the Primary Link Indication Bitmap subfield is included in the Mobile AP MLD Link Change Element, then at step 680, the link(s) indicated in the Primary Link Indication Bitmap subfield (by setting the corresponding bit positions to 1) become the primary link(s) and other links become the non-primary links.

Figure 7:
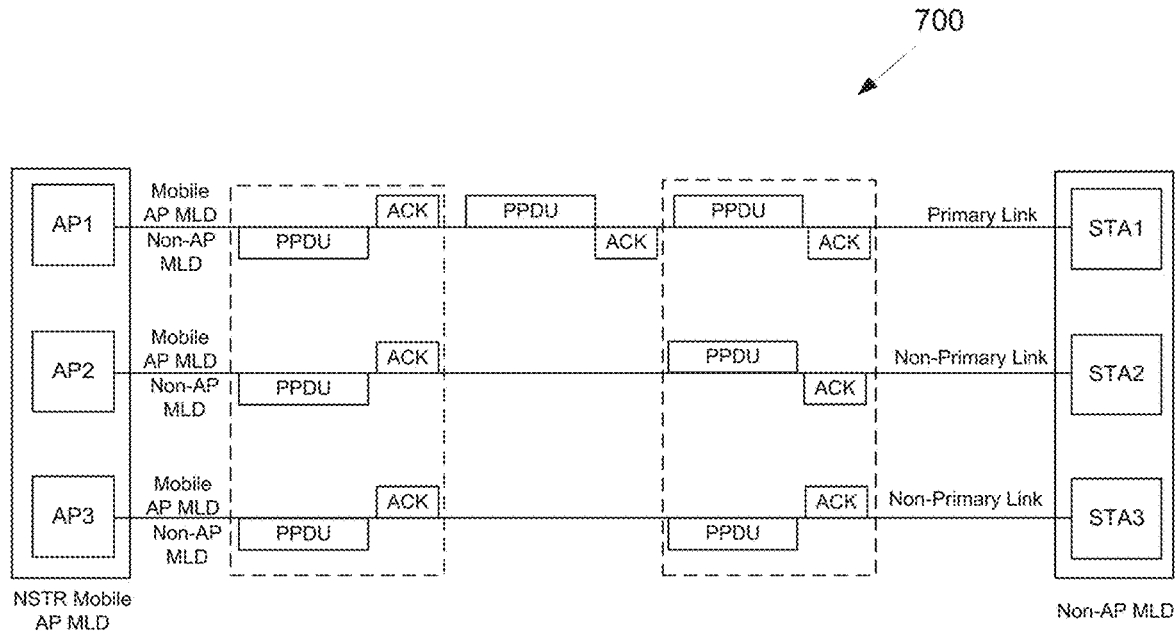
FIG. 7 illustrates an example of a synchronous transmission on two non-primary links with the primary link for an NSTR Mobile AP MLD where both non-primary links for NSTR link pairs with the primary link according to embodiments of the present disclosure.

FIG. 7 illustrates an example of a synchronous transmission on two non-primary links with the primary link for an NSTR Mobile AP MLD where both non-primary links form NSTR link pairs with the primary link 700 according to embodiments of the present disclosure. The embodiment of the synchronous transmission on two non-primary links with the primary link for an NSTR Mobile AP MLD where both non-primary links for NSTR link pairs with the primary link 700 shown in FIG. 7 is for illustration only. Other embodiments of the synchronous transmission on two non-primary links with the primary link for an NSTR Mobile AP MLD where both non-primary links for NSTR link pairs with the primary link 700 could be used without departing from the scope of this disclosure.

According to one embodiment, there can be more than two links of for a Mobile AP MLD. There can be one primary link and multiple non-primary links as illustrated in FIG. 7. According to one embodiment, STAs operating on the non-primary links form STR link pairs with the STA operating on the primary link. In such cases the PPDU transmissions on the non-primary links need to be synchronized with the PPDU transmission on the primary link. According to one embodiment, STAs affiliated with a non-AP MLD that is associated with the Mobile AP MLD and operating on the non-primary links receive their TSF timer information from the Beacon sent to the STA affiliated with the same non-AP MLD and operating on the primary link. The Beacon and Probe Response frame is transmitted only on the primary link. According to one embodiment, none of the STAs affiliated with the non-AP MLD and operating on the non-primary links can send an ML Probe Request frame to their associated APs affiliated with the Mobile AP MLD.

Figure 8:
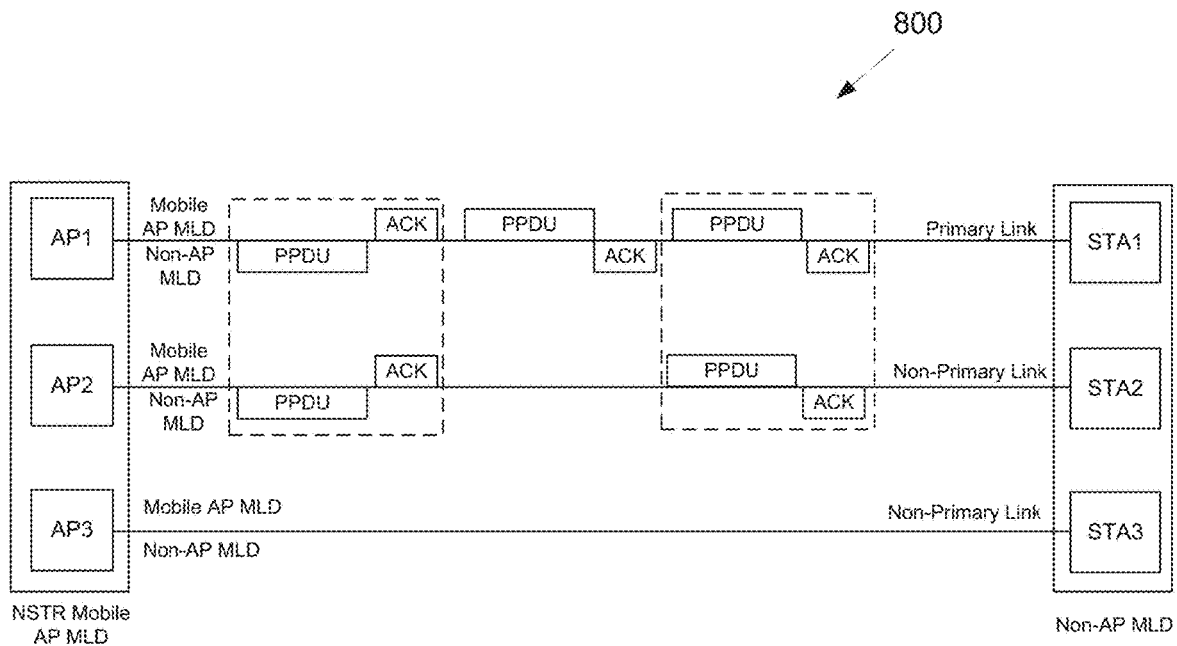
FIG. 8 illustrates an example of a synchronous transmission on one non-primary link with the primary link for an NSTR Mobile AP MLD where only one of the two non-primary links forms an NSTR link pair with the primary link according to embodiments of the present disclosure.

FIG. 8 illustrates an example of a synchronous transmission on one non-primary link with the primary link for an NSTR Mobile AP MLD where only one of the two non-primary links forms an NSTR link pair with the primary link 800 according to embodiments of the present disclosure. The embodiment of the synchronous transmission on one non-primary link with the primary link for an NSTR Mobile AP MLD where only one of the two non-primary links forms an NSTR link pair with the primary link 800 shown in FIG. 8 is for illustration only. Other embodiments of the synchronous transmission on one non-primary link with the primary link for an NSTR Mobile AP MLD where only one of the two non-primary links forms an NSTR link pair with the primary link 800 could be used without departing from the scope of this disclosure.

Figure 9:
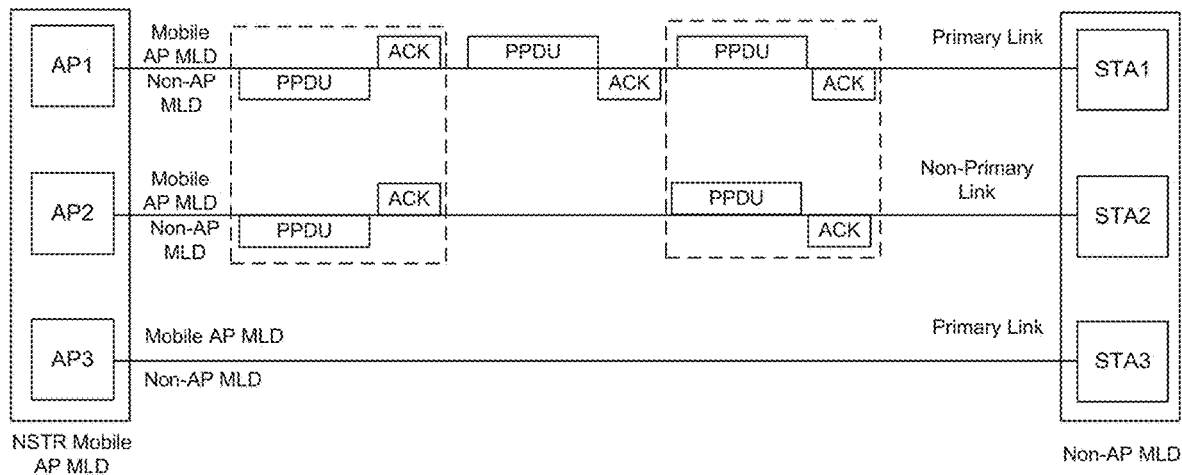
FIG. 9 illustrates an example of a synchronous transmission on one non-primary link with one primary link out of two primary links for an NSTR Mobile AP MLD according to embodiments of the present disclosure.

FIG. 9 illustrates an example of a synchronous transmission on one non-primary link with one primary link out of two primary links for an NSTR Mobile AP MLD 900 according to embodiments of the present disclosure. The embodiment of the synchronous transmission on one with one primary link out of two primary links for an NSTR Mobile AP MLD 900 shown in FIG. 9 is for illustration only. Other embodiments of the synchronous transmission on one with one primary link out of two primary links for an NSTR Mobile AP MLD 900 could be used without departing from the scope of this disclosure.

Figure 10:
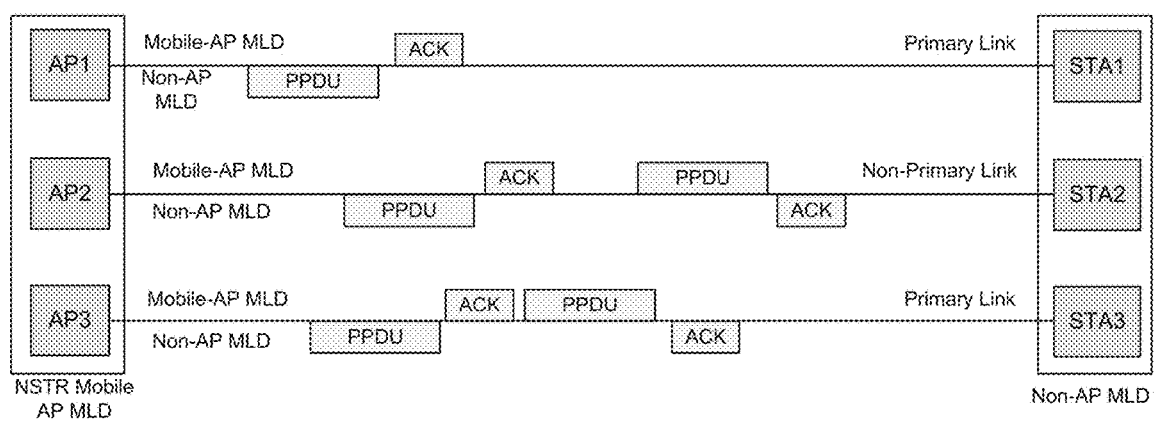
FIG. 10 illustrates an example of an asynchronous transmission on two primary links and a non-primary link for an NSTR Mobile AP MLD according to embodiments of the present disclosure.

FIG. 10 illustrates an example of an asynchronous transmission on two primary links and a non-primary link for an NSTR Mobile AP MLD 1000 according to embodiments of the present disclosure. The embodiment of the asynchronous transmission on two primary links and a non-primary link for an NSTR Mobile AP MLD 1000 shown in FIG. 10 is for illustration only. Other embodiments of the asynchronous transmission on two primary links and a non-primary link for an NSTR Mobile AP MLD 1000 could be used without departing from the scope of this disclosure.

According to one embodiment, if a Mobile AP MLD has more than one primary link, then more than one APs affiliated with the Mobile AP MLD and operating on the primary links do not include an RNR element reporting the same AP affiliated with the Mobile AP MLD and operating on a non-primary link. The STA affiliated with a non-AP MLD associated with the Mobile AP MLD and operating on a non-primary link corresponding to the reported AP shall receive its TSF timer information and other parameters from the Beacon transmitted by the reporting AP affiliated with the Mobile AP MLD. According to one embodiment, if the reporting AP and the reported AP forms an NSTR link pair, then frame transmission on the non-primary link corresponding to the reported AP shall be synchronized with the frame transmission on the primary link corresponding to the reporting AP.

According to one embodiment, a Mobile AP MLD and its associated non-AP MLD can only use single stream for transmission on the non-Primary link.

According to one embodiment, an STA affiliated with a non-AP MLD that is associated with the NSTR mobile AP MLD shall align the end time of the PPDU transmitted on the non-primary link with that transmitted on the primary link. According to another embodiment, an STA affiliated with a non-AP MLD that is associated with the NSTR mobile AP MLD shall align both start time and end time of the PPDU transmitted on the non-primary link with that transmitted on the primary link.

Figure 11:
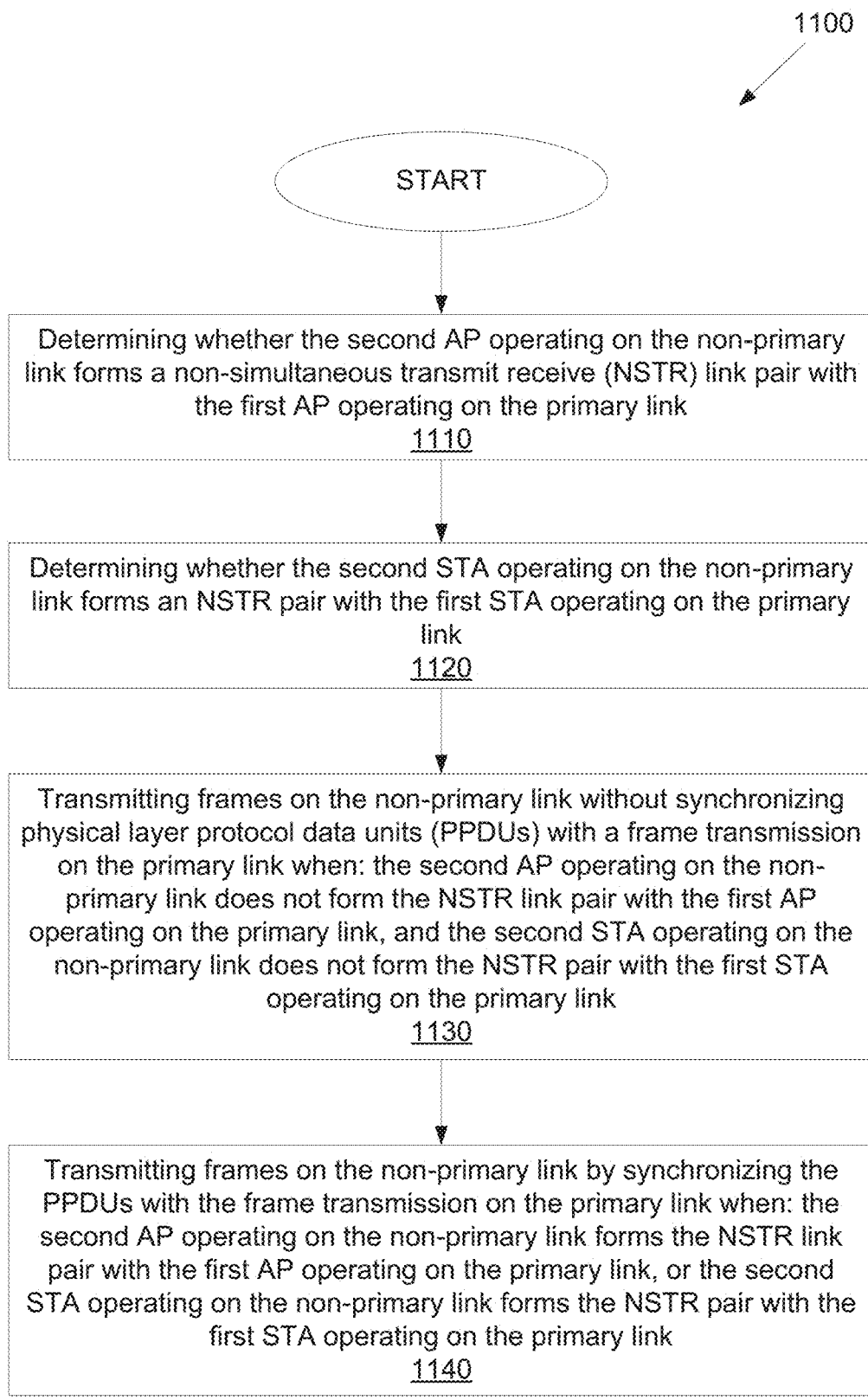
FIG. 11 illustrates a flow chart of a method for operating a non-AP MLD according to embodiments of the present disclosure.

FIG. 11 illustrates a flow chart of a method 1100 for operating a non-AP MLD that comprises stations, such as STA 114 illustrated in FIG. 1, according to embodiments of the present disclosure. The embodiment of the method 1100 for operating a non-AP MLD shown in FIG. 11 is for illustration only. Other embodiments of the method 1100 for operating a non-AP MLD could be used without departing from the scope of this disclosure.

As illustrated in FIG. 11, the method 1100 begins at step 1110. In step 1110, the non-AP MLD determines whether the second AP operating on the non-primary link forms a non-simultaneous transmit receive (NSTR) link pair with the first AP operating on the primary link.

At step 1120, the non-AP MLD determines whether the second STA operating on the non-primary link forms an NSTR pair with the first STA operating on the primary link.

At step 1130, the non-AP MLD transmits frames on the non-primary link without synchronizing physical layer protocol data units (PPDUs) with a frame transmission on the primary link when: the second AP operating on the non-primary link does not form the NSTR link pair with the first AP operating on the primary link, and the second STA operating on the non-primary link does not form the NSTR pair with the first STA operating on the primary link.

At step 1140, the non-AP MLD transmits frames on the non-primary link by synchronizing the PPDUs with the frame transmission on the primary link when: the second AP operating on the non-primary link forms the NSTR link pair with the first AP operating on the primary link, or the second STA operating on the non-primary link forms the NSTR pair with the first STA operating on the primary link.

In one embodiment, the second AP operating on the non-primary link does not form the NSTR link pair with the first AP operating on the primary link, and the non-AP MLD receives a beacon and probe response frame only via the first STA operating on the primary link, controls the second STA operating on the non-primary link based on timing synchronization function (TSF) timer information identified based on the beacon and probe response frame received via the first STA operating on the primary link, and sends, by the first STA operating on the primary link, a multi-link (ML) probe request frame to the first AP operating on the primary link to request profile information of the second AP operating on the non-primary link.

In one embodiment, the second AP operating on the non-primary link does not form the NSTR link pair with the first AP operating on the primary link, and the non-AP MLD receives, by the first STA operating on the primary link, from the first AP operating on the primary link, a reduced neighbor report (RNR) element in a beacon frame, corresponding to the second AP operating on the non-primary link, wherein a field of the RNR element is set to a value indicating the second AP operating on the non-primary link.

In one embodiment, the second AP operating on the non-primary link does not form the NSTR link pair with the first AP operating on the primary link, and the non-AP MLD receives, by one of the STAs, a frame, from the AP MLD, designating the non-primary link as the primary link and the primary link as the non-primary link.

In one embodiment, a third of the STAs operates on a second non-primary link, the second and third STAs operating on the non-primary links form simultaneous transmit receive (STR) link pairs with the first STA operating on the primary link, and the non-AP MLD transmits, by the second and third STAs operating on the non-primary link, frames on the non-primary link by synchronizing the PPDUs with the frame transmission on the primary link.

In one embodiment, a third of the STAs operates on a second primary link, only the first and third STAs operating on the primary link are configured to receive a beacon and probe response frame, and the non-AP MLD controls the second STA operating on the non-primary link based on timing synchronization function (TSF) timer information based on the beacon and probe response frame received via the first or third STAs operating on the primary link.

The above flowchart illustrates an example method or process that can be implemented in accordance with the principles of the present disclosure and various changes could be made to the methods or processes illustrated in the flowcharts. For example, while shown as a series of steps, various steps could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A non-access point (AP) multi-link device (MLD) comprising:
   stations (STAs) comprising transceivers, respectively, a first of the STAs configured to form a primary link with a first AP of a mobile AP MLD, a second of the STAs configured to form a non-primary link with a second AP of the mobile AP MLD; and
   a processor operably coupled to the STAs, the processor configured to:
      determine whether the second AP operating on the non-primary link forms a non-simultaneous transmit receive (NSTR) link pair with the first AP operating on the primary link; and
      determine whether the second STA operating on the non-primary link forms an NSTR pair with the first STA operating on the primary link,
   wherein the second STA is further configured to:
      transmit frames on the non-primary link without synchronizing physical layer protocol data units (PPDUs) with a frame transmission on the primary link when:
         the second AP operating on the non-primary link does not form the NSTR link pair with the first AP operating on the primary link, and
         the second STA operating on the non-primary link does not form the NSTR pair with the first STA operating on the primary link, and
      transmit frames on the non-primary link by synchronizing the PPDUs with the frame transmission on the primary link when:
         the second AP operating on the non-primary link forms the NSTR link pair with the first AP operating on the primary link, or
         the second STA operating on the non-primary link forms the NSTR pair with the first STA operating on the primary link.

2. The non-AP MLD of claim 1, wherein:
   the second AP operating on the non-primary link does not form the NSTR link pair with the first AP operating on the primary link,
   only the first STA operating on the primary link is configured to receive a beacon and probe response frame,
   the processor is further configured to control the second STA operating on the non-primary link based on timing synchronization function (TSF) timer information identified based on the beacon and probe response frame received via the first STA operating on the primary link, and
   the first STA operating on the primary link is configured to send a multi-link (ML) probe request frame to the first AP operating on the primary link to request profile information of the second AP operating on the non-primary link.

3. The non-AP MLD of claim 1, wherein:
the second AP operating on the non-primary link does not form the NSTR link pair with the first AP operating on the primary link,
the first STA operating on the primary link is configured to receive, from the first AP operating on the primary link, a reduced neighbor report (RNR) element in a beacon frame, corresponding to the second AP operating on the non-primary link, and
a field of the RNR element is set to a value indicating the second AP operating on the non-primary link.

4. The non-AP MLD of claim 1, wherein:
the second AP operating on the non-primary link does not form the NSTR link pair with the first AP operating on the primary link, and
one of the STAs is configured to receive a frame, from the AP MLD, designating the non-primary link as the primary link and the primary link as the non-primary link.

5. The non-AP MLD of claim 1, wherein:
a third of the STAs operates on a second non-primary link,
the second and third STAs operating on the non-primary links form simultaneous transmit receive (STR) link pairs with the first STA operating on the primary link, and
the second and third STAs operating on the non-primary link are configured to transmit frames on the non-primary link by synchronizing the PPDUs with the frame transmission on the primary link.

6. The non-AP MLD of claim 1, wherein:
a third of the STAs operates on a second primary link,
only the first and third STAs operating on the primary link are configured to receive a beacon and probe response frame, and
the processor is further configured to control the second STA operating on the non-primary link based on timing synchronization function (TSF) timer information based on the beacon and probe response frame received via the first or third STAs operating on the primary link.

7. The non-AP MLD of claim 1, wherein:
the second AP operating on the non-primary link forms the NSTR link pair with the first AP operating on the primary link, and
the processor is configured to align respective end times of the PPDUs transmitted on the non-primary link with an end time of the PPDU transmitted on the primary link.

8. An access point (AP) multi-link device (MLD) comprising:
APs comprising transceivers, respectively, a first of the APs configured to form a primary link with a first station (STA) of a non-AP MLD, a second of the APs configured to form a non-primary link with a second STA of the non-AP MLD; and
a processor operably coupled to the APs, the processor configured to:
instruct the APs to form the primary link and the non-primary link;
determine whether the second AP operating on the non-primary link forms a non-simultaneous transmit receive (NSTR) link pair with the first AP operating on the primary link; and
determine whether the second STA operating on the non-primary link forms an NSTR pair with the first STA operating on the primary link,
wherein the second AP is further configured to:
transmit frames on the non-primary link without synchronizing physical layer protocol data units (PPDUs) with a frame transmission on the primary link when:
the second AP operating on the non-primary link does not form the NSTR link pair with the first AP operating on the primary link, and
the second STA operating on the non-primary link does not form the NSTR pair with the first STA operating on the primary link, and
transmit frames on the non-primary link by synchronizing the PPDUs with the frame transmission on the primary link when:
the second AP operating on the non-primary link forms the NSTR link pair with the first AP operating on the primary link, or
the second STA operating on the non-primary link forms the NSTR pair with the first STA operating on the primary link.

9. The AP MLD of claim 8, wherein:
the second AP operating on the non-primary link does not form the NSTR link pair with the first AP operating on the primary link,
only the first AP operating on the primary link is configured to transmit a beacon and probe response frame, and
the first AP operating on the primary link is configured to receive a multi-link (ML) probe request frame from the first STA operating on the primary link to request profile information of the second AP operating on the non-primary link.

10. The AP MLD of claim 8, wherein:
the second AP operating on the non-primary link does not form the NSTR link pair with the first AP operating on the primary link,
the first AP operating on the primary link is configured to transmit, to the first STA operating on the primary link, a reduced neighbor report (RNR) element in a beacon frame, corresponding to the second AP operating on the non-primary link, and
a field of the RNR element is set to a value indicating the second AP operating on the non-primary link.

11. The AP MLD of claim 8, wherein:
the second AP operating on the non-primary link does not form the NSTR link pair with the first AP operating on the primary link, and
one of the APs is configured to transmit a frame designating the non-primary link as the primary link and the primary link as the non-primary link.

12. The AP MLD of claim 8, wherein:
a third of the APs operates on a second non-primary link,
the second and third APs operating on the non-primary links form simultaneous transmit receive (STR) link pairs with the first AP operating on the primary link, and
the second and third APs operating on the non-primary link are configured to transmit frames on the non-primary link by synchronizing the PPDUs with the frame transmission on the primary link.

13. The AP MLD of claim 8, wherein:
a third of the APs operates on a second primary link, and only the first and third APs operating on the primary link are configured to transmit a beacon and probe response frame.

14. The AP MLD of claim 8, wherein:
the second AP operating on the non-primary link forms the NSTR link pair with the first AP operating on the primary link, and
the processor is configured to align respective end times of the PPDUs transmitted on the non-primary link with an end time of the PPDU transmitted on the primary link.

15. A method of wireless communication performed by a non-access point (AP) multi-link device (MLD) that comprises stations (STAs) comprising transceivers, respectively, a first of the STAs configured to form a primary link with a first AP of a mobile AP MLD, a second of the STAs configured to form a non-primary link with a second AP of the mobile AP MLD, the method comprising:
determining whether the second AP operating on the non-primary link forms a non-simultaneous transmit receive (NSTR) link pair with the first AP operating on the primary link;
determining whether the second STA operating on the non-primary link forms an NSTR pair with the first STA operating on the primary link;
transmitting frames on the non-primary link without synchronizing physical layer protocol data units (PPDUs) with a frame transmission on the primary link when:
the second AP operating on the non-primary link does not form the NSTR link pair with the first AP operating on the primary link, and
the second STA operating on the non-primary link does not form the NSTR pair with the first STA operating on the primary link, and
transmitting frames on the non-primary link by synchronizing the PPDUs with the frame transmission on the primary link when:
the second AP operating on the non-primary link forms the NSTR link pair with the first AP operating on the primary link, or
the second STA operating on the non-primary link forms the NSTR pair with the first STA operating on the primary link.

16. The method of claim 15, wherein the second AP operating on the non-primary link does not form the NSTR link pair with the first AP operating on the primary link, the method further comprising:
receiving a beacon and probe response frame only via the first STA operating on the primary link;
controlling the second STA operating on the non-primary link based on timing synchronization function (TSF) timer information identified based on the beacon and probe response frame received via the first STA operating on the primary link; and
sending, by the first STA operating on the primary link, a multi-link (ML) probe request frame to the first AP operating on the primary link to request profile information of the second AP operating on the non-primary link.

17. The method of claim 15, wherein the second AP operating on the non-primary link does not form the NSTR link pair with the first AP operating on the primary link, the method further comprising:
receiving, by the first STA operating on the primary link, from the first AP operating on the primary link, a reduced neighbor report (RNR) element in a beacon frame, corresponding to the second AP operating on the non-primary link,
wherein a field of the RNR element is set to a value indicating the second AP operating on the non-primary link.

18. The method of claim 15, wherein the second AP operating on the non-primary link does not form the NSTR link pair with the first AP operating on the primary link, the method further comprising:
receiving, by one of the STAs, a frame, from the AP MLD, designating the non-primary link as the primary link and the primary link as the non-primary link.

19. The method of claim 15, wherein a third of the STAs operates on a second non-primary link, and the second and third STAs operating on the non-primary links form simultaneous transmit receive (STR) link pairs with the first STA operating on the primary link, the method further comprising:
transmitting, by the second and third STAs operating on the non-primary link, frames on the non-primary link by synchronizing the PPDUs with the frame transmission on the primary link.

20. The method of claim 15, wherein a third of the STAs operates on a second primary link, and only the first and third STAs operating on the primary link are configured to receive a beacon and probe response frame, the method further comprising:
controlling the second STA operating on the non-primary link based on timing synchronization function (TSF) timer information based on the beacon and probe response frame received via the first or third STAs operating on the primary link.

* * * * *